United States Patent [19]

Kovacs et al.

[11] Patent Number: 4,999,974
[45] Date of Patent: Mar. 19, 1991

[54] METHOD OF AND APPARATUS FOR FORMING FILLING AND SEALING PACKAGES

[75] Inventors: Lloyd Kovacs; Robert C. James, both of Sheboygan, Wis.; Gianfranco Ceriani, Zingonia, Italy

[73] Assignee: Hayssen Manufacturing Company, Sheboygan, Wis.

[21] Appl. No.: 499,894

[22] Filed: Mar. 26, 1990

[51] Int. Cl.$^5$ ............... B65B 9/20; B65B 51/14; B65B 51/32
[52] U.S. Cl. ..................... 53/434; 53/451; 53/511; 53/551; 53/552
[58] Field of Search ............ 53/434, 451, 433, 511, 53/551, 552, 373, 477, 554

[56] References Cited

U.S. PATENT DOCUMENTS

| | | | |
|---|---|---|---|
| 3,256,673 | 6/1966 | Tew et al. | 53/551 |
| 4,391,081 | 7/1983 | Kovacs | 53/552 X |
| 4,506,494 | 3/1985 | Shimoyama et al. | 53/551 |
| 4,512,138 | 4/1985 | Greenawalt | 53/552 X |
| 4,532,753 | 8/1985 | Kovacs | 53/451 |
| 4,563,862 | 1/1986 | McElvy | 53/552 |
| 4,630,429 | 12/1986 | Christine | 53/551 X |
| 4,719,741 | 1/1988 | Mabry | 53/451 |
| 4,750,313 | 6/1988 | Kammler et al. | 53/552 X |
| 4,947,621 | 8/1990 | Christine et al. | 53/551 X |

FOREIGN PATENT DOCUMENTS 1334616 10/1973 United Kingdom .

Primary Examiner—Horace M. Culver
Attorney, Agent, or Firm—Senniger, Powers, Leavitt & Roedel

[57] ABSTRACT

Method of and apparatus for forming filling and sealing packages in which flexible packaging material is formed into tubing, the tubing is fed downwardly and transversely heat sealed at package length intervals by closing a pair of sealing members, the seal area is cut to form a top seal of the package being completed and a bottom seal for the next package to be formed, a quantity of product with which the packages are to be filled is delivered into the lower end of the tubing to provide a fill for each package, the tubing is pinched closed, after the delivery of each fill, above and below the level of the next seal to be made, the pinches are maintained as the sealing members are opened, following the formation of the aforementioned top and bottom seals, to keep product for the next fill from dropping down on the bottom seal, and to hold the package being completed from dropping away, and air is blown on the top and bottom seals to cool them while the pinches are maintained. The movement of the upper and lower pinch members between their open and closed positions are independent of the movement of the sealing members between their open and close positions so that the timing of the opening and closing of the pinch members relative to the opening and closing of the sealing members may be varied.

23 Claims, 11 Drawing Sheets

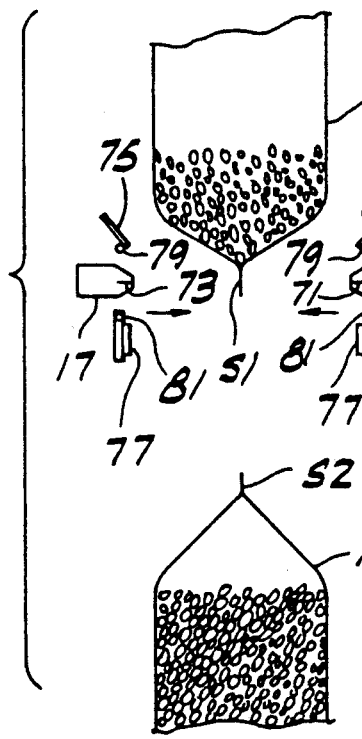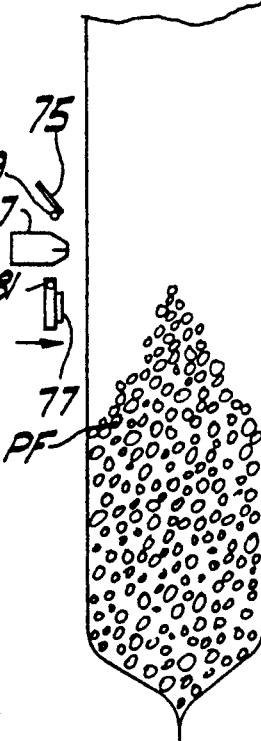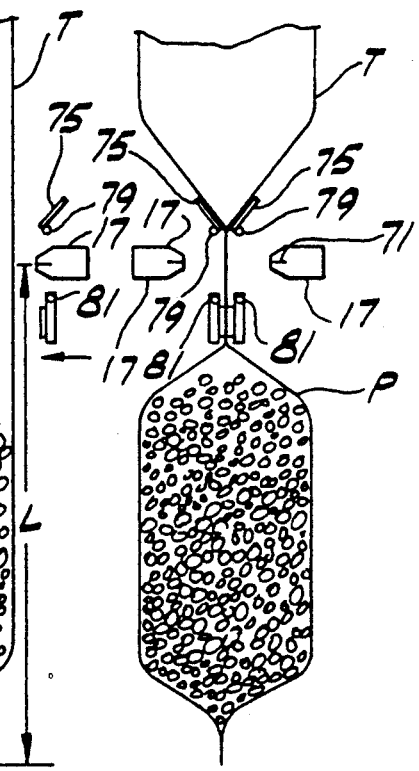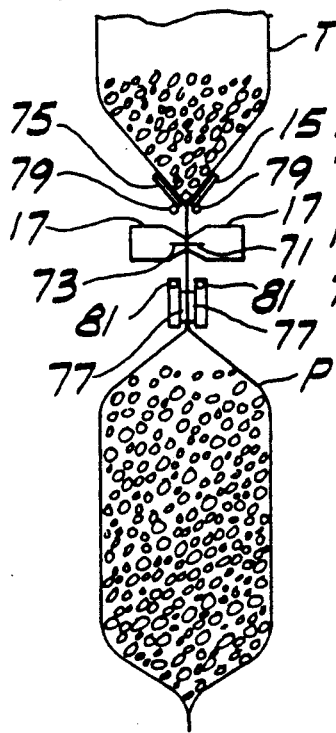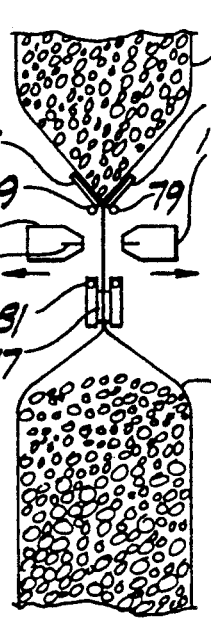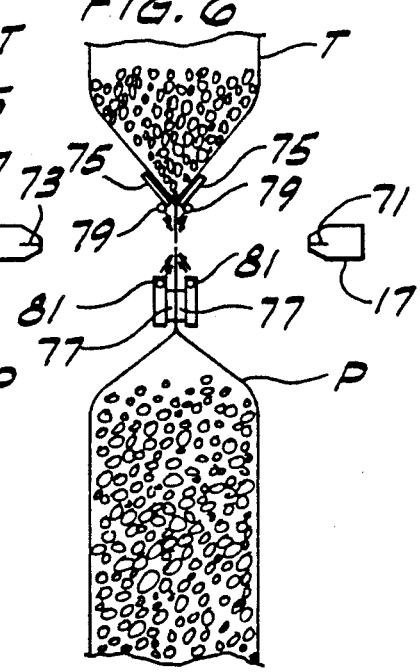

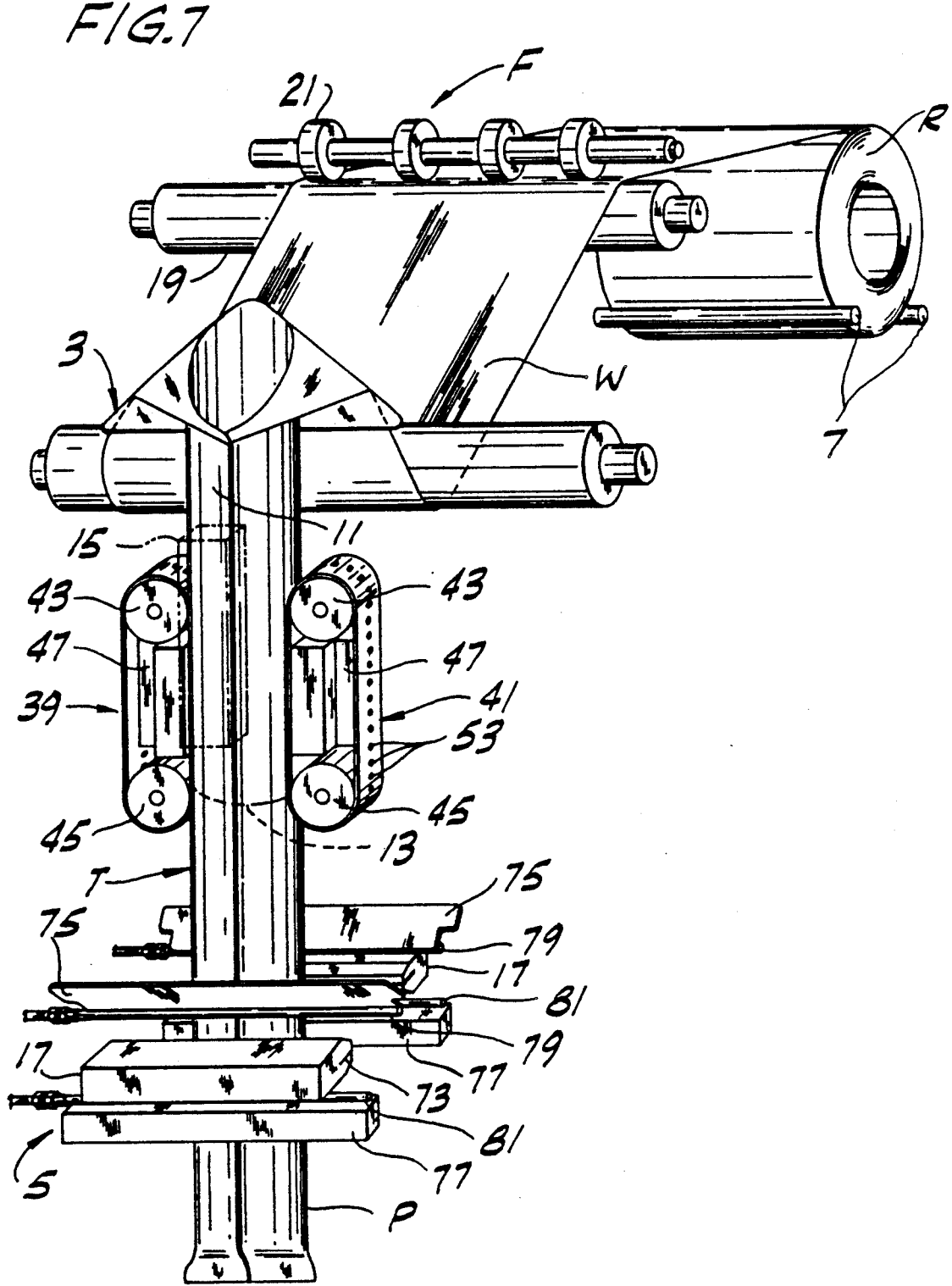

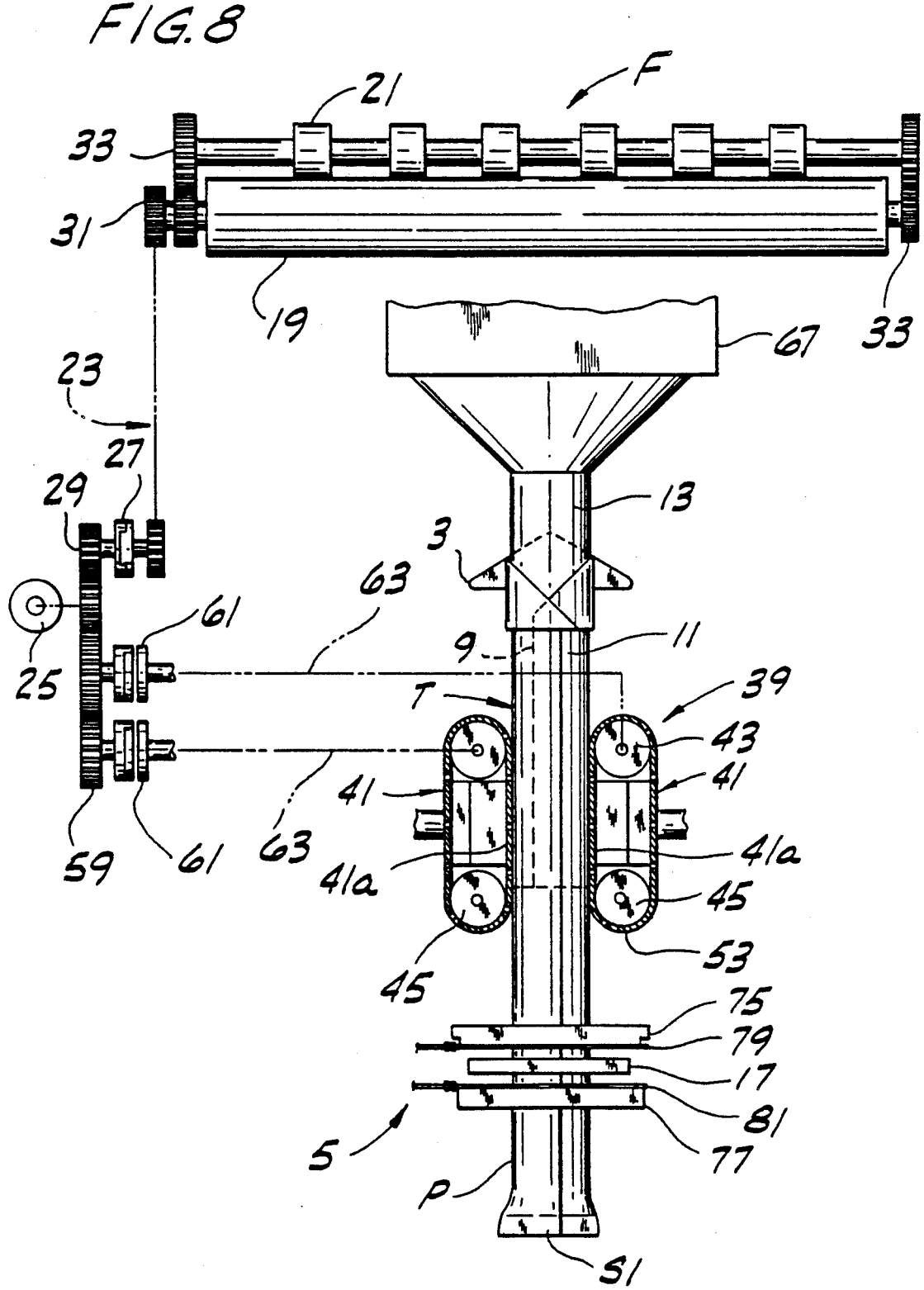

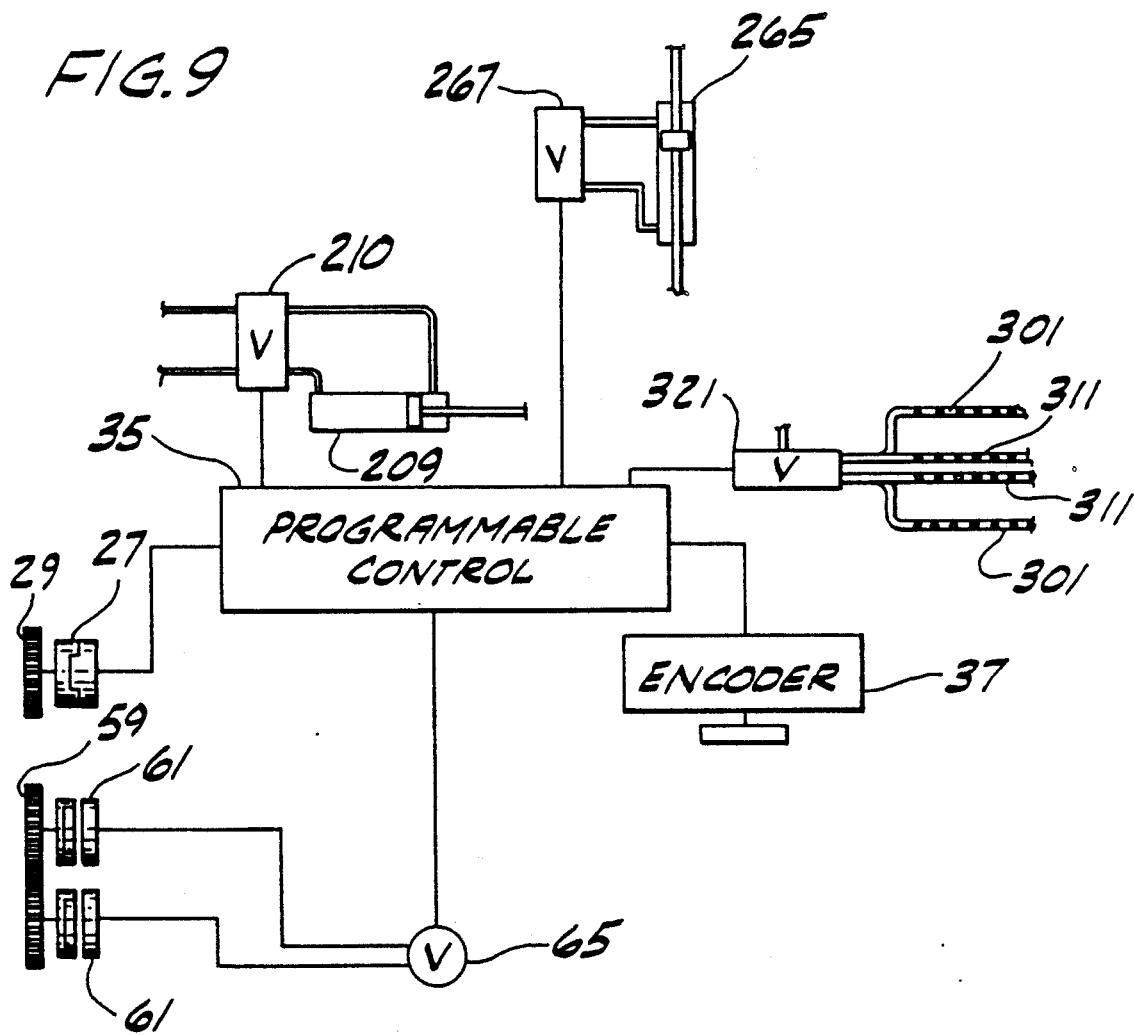

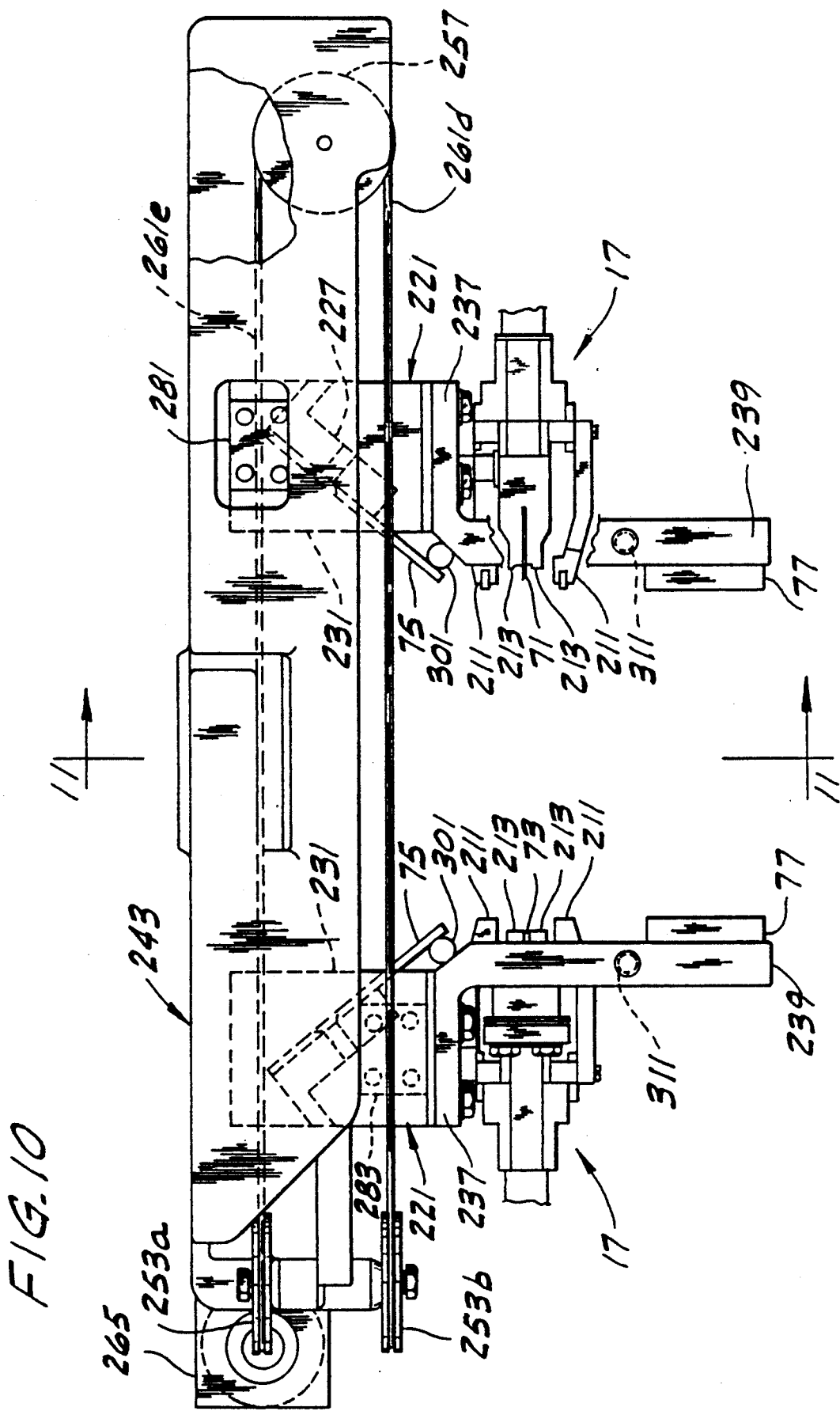

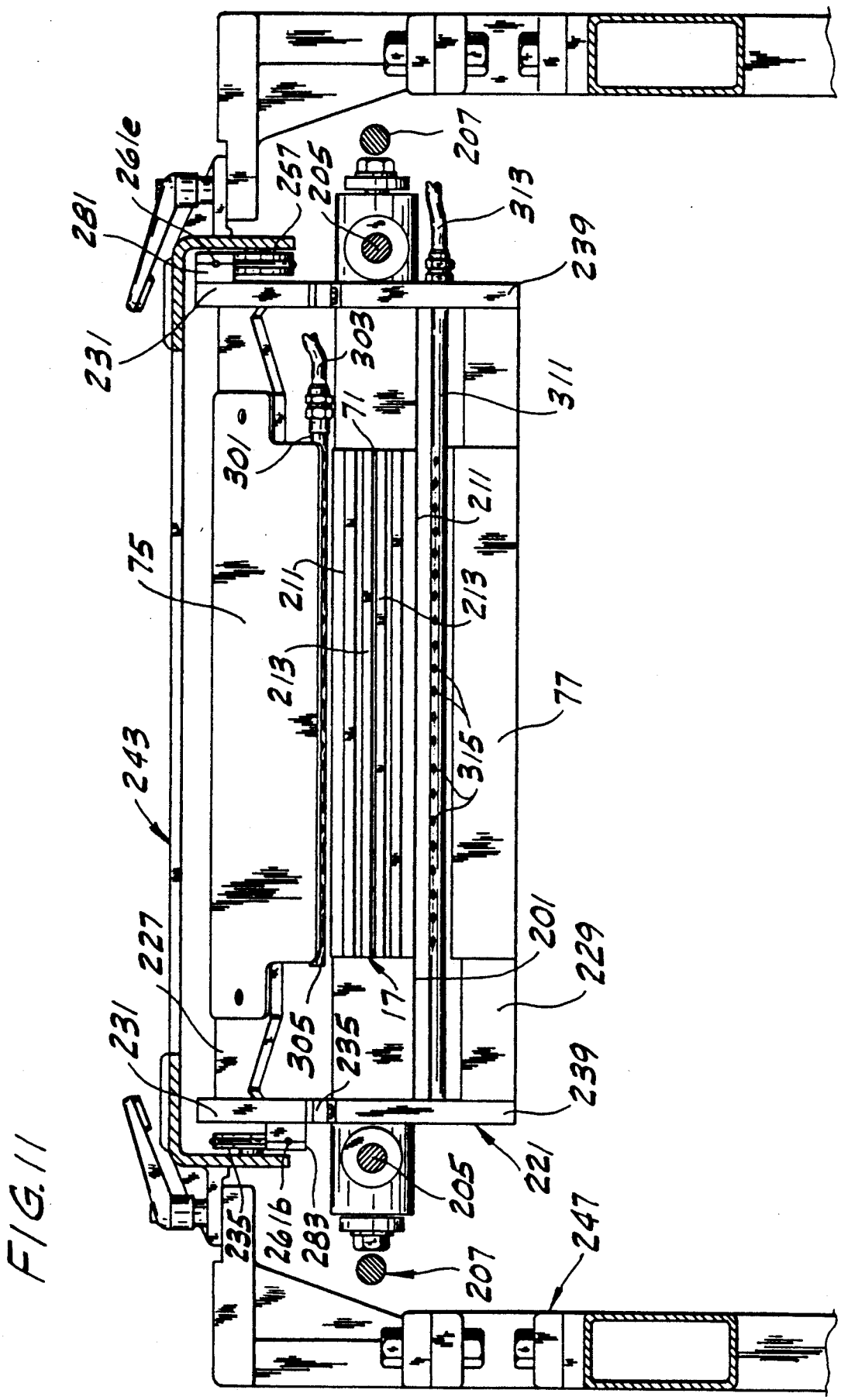

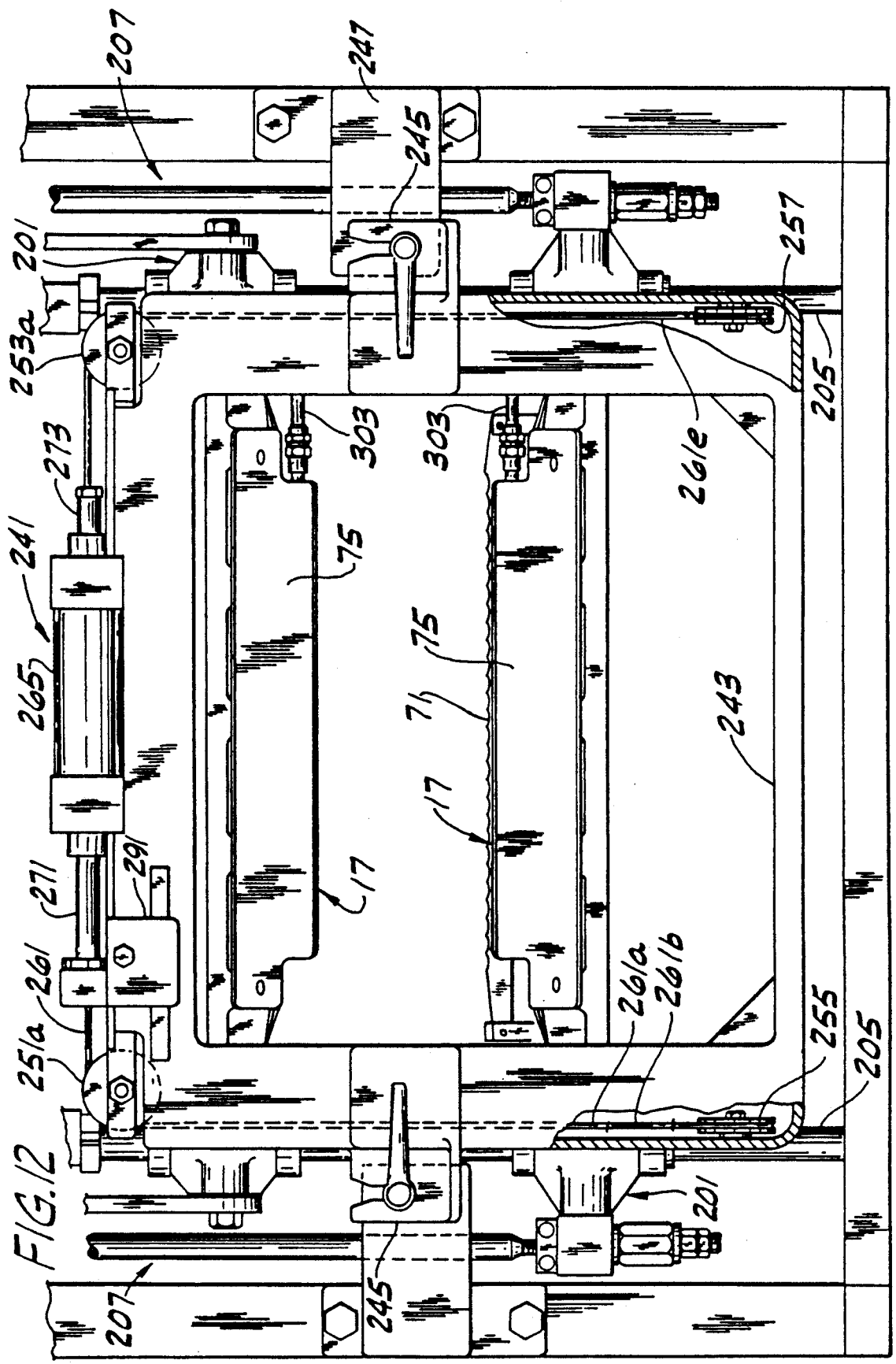

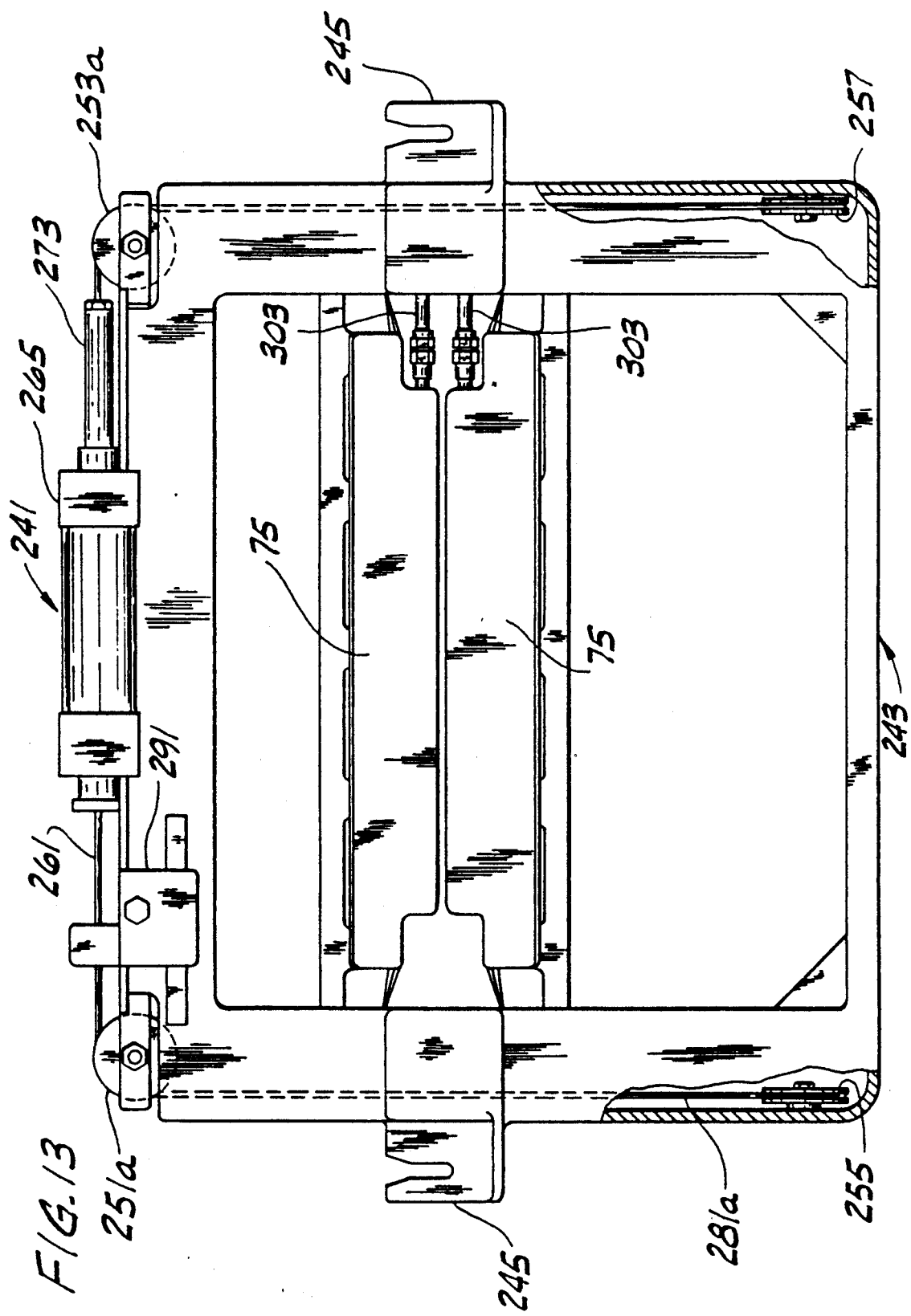

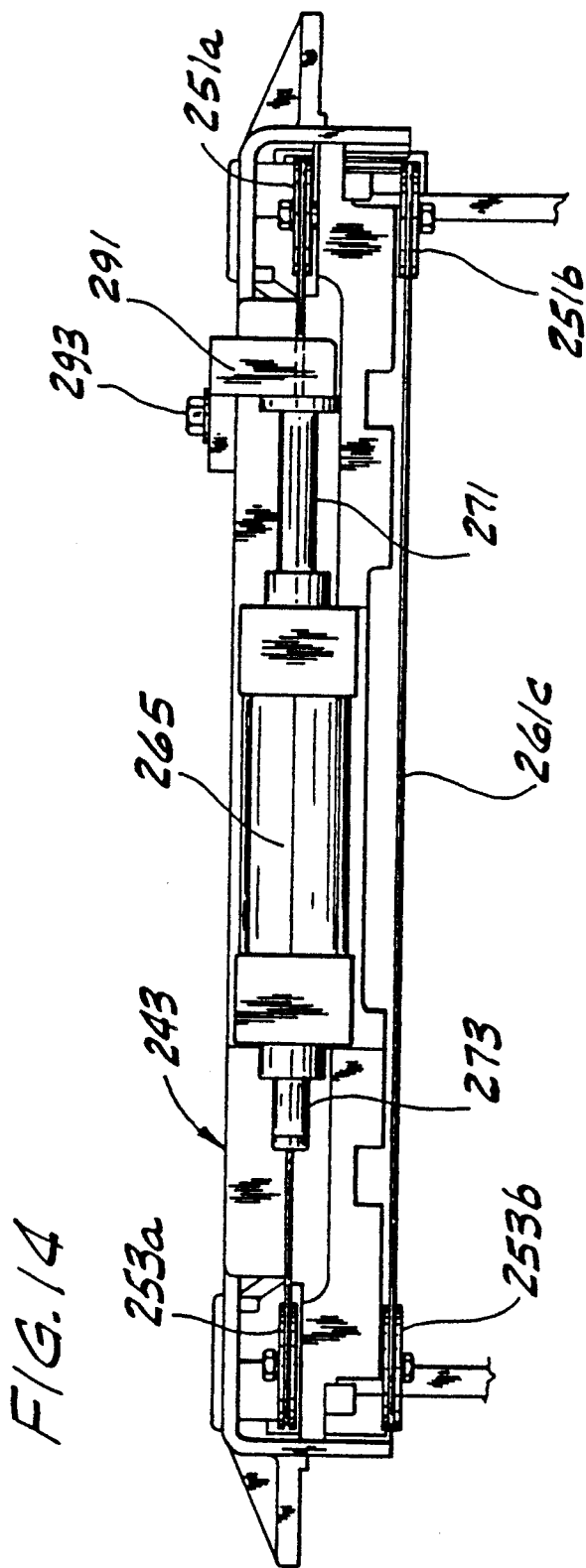

METHOD OF AND APPARATUS FOR FORMING FILLING AND SEALING PACKAGES

BACKGROUND OF THE INVENTION

This invention relates to methods of and apparatus for forming, filling and sealing packages, and more particularly to vertical form-fill-seal packaging methods and apparatus.

This invention represents an improvement over the invention described in co-assigned U.S. Pat. No. 4,532,753 which is directed to the type of package forming, filling and sealing in which flexible packaging material is formed into tubing, the tubing is fed downwardly and transversely heat sealed at package length intervals, and a quantity of product with which the packages are to be filled is delivered into the lower end of the tubing to provide a fill for each package. It has been found that, in carrying out this type of packaging, if product drops down in the tubing on a seal before the seal has adequately cooled or set, the strain on the seal may be sufficient to spoil it. The invention described in the above-mentioned U.S. Pat. No. 4,532,753 is directed to solving that problem. While the apparatus and method of that patent have proved to be generally satisfactory in cooling the bottom seals of packages, there is no provision for cooling the top seals of packages being completed, with the attendant possibility of failure of these seals when the packages drop onto a receiving plate or takeaway conveyor.

SUMMARY OF THE INVENTION

Among the several objects of this invention may be noted the provision of an improved method of and apparatus for forming, filling and sealing packages wherein both the top and bottom seals of each package are cooled after the sealing operation to protect the seals against damage without unduly slowing down production of packages; the provision of such method and apparatus which is programmable readily to accommodate different package materials and thicknesses of material; and the provision of such a method and apparatus wherein the upper end of each package being completed is deflated to exhaust air above the product fill from the package prior to closure of the package.

In general, the method and apparatus of this invention are applied to the forming, filling and sealing of packages wherein flexible packaging material is formed into tubing, the tubing extending downwardly, the tubing is fed downwardly and transversely heat sealed at package length intervals by a pair of sealing members, and a quantity of the product with which the packages are to be filled is delivered into the lower end of the tubing to provide a fill for each package. This invention is characterized in that with the sealing members open and after delivery of the fill into the tubing, and before the next seal is made, the tubing is pinched closed above and below the sealing members by upper and lower pairs of pinch members, the sealing members are closed to form the next seal, the seal is cut while the sealing members are closed to form the top seal of a package being completed and the bottom seal of the next package to be formed, the sealing members are opened to expose the top and bottom seals, and air is blown on the top and bottom seals to cool them. The movement of the upper and lower pinch members between their open and closed positions is independent of the movement of the sealing members between their open and closed positions so that the timing of the opening and closing of the upper and lower pinch members relative to the opening and closing of the sealing members may be varied. This timing is varied according to the interval of time necessary to form and/or cool the top and bottom seals.

In another aspect of the invention, the lower pair of pinch members are so positioned and configured that when they pinch the tubing closed, they function to deflate the tubing in the area above the product fill in each package being completed.

Other objects and features will be in part apparent and in part pointed out hereinafter.

BRIEF DESCRIPTION OF THE DRAWINGS

FIGS. 1-6 are diagrammatic views illustrating the method of this invention and the sequence of operation of certain components (sealing jaws and upper and lower pinch members) of apparatus embodying the invention;

FIG. 7 is a perspective of a vertical form/fill/seal machine embodying this invention;

FIG. 8 is a front elevation of FIG. 7 showing certain drive mechanism of the machine;

FIG. 9 is a control circuit diagram;

FIG. 10 is a side elevation with parts broken away to show the sealing jaws and the upper and lower pinch members, all in their open position;

FIG. 11 is a vertical section taken generally on line 11—11 of FIG. 10;

FIG. 12 is a plan, with parts broken away, showing the pinch member actuating mechanism and the sealing jaws and the pinch members in their open positions FIG. 13 is a view similar to FIG. 12 with parts removed for clarity, showing the upper pinch members in their closed position;

FIG. 14 is an end elevation of FIG. 13;

Corresponding reference characters indicate corresponding parts throughout the several views of the drawings.

DESCRIPTION OF THE PREFERRED EMBODIMENT

Figure 15:
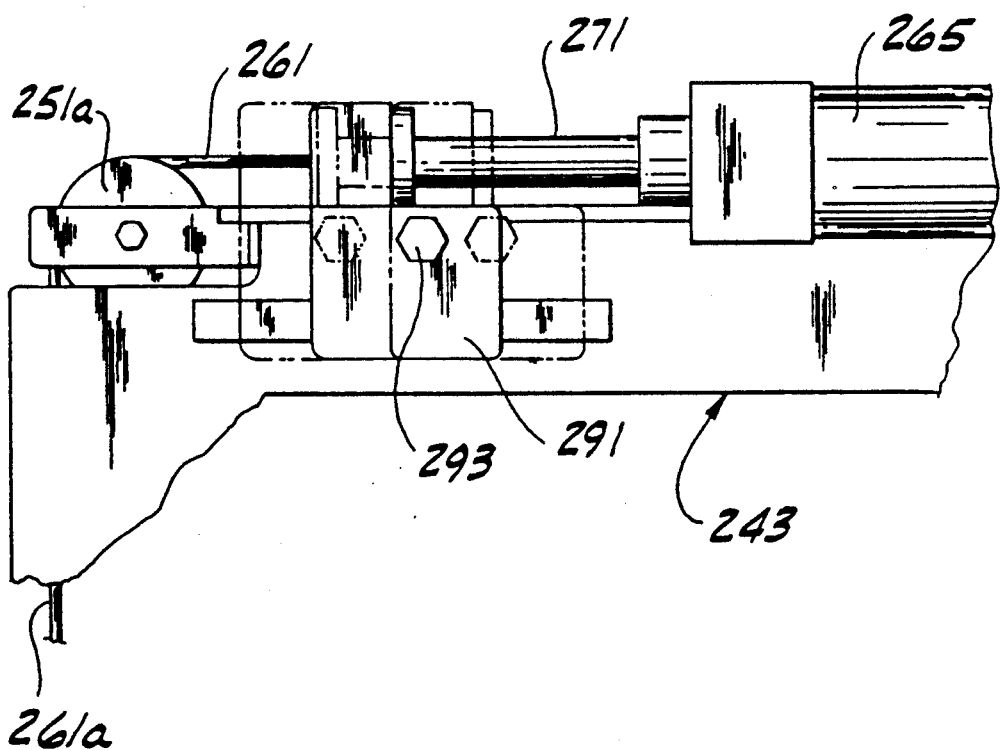
FIG. 15 is an enlarged portion of FIG. 13 showing a bumper block component for controlling the extent of opening of the pinch members.

Referring first to FIGS. 1-6 of the drawings, the invention is shown as it relates to the forming, filling and sealing of packages involving the forming of flexible packaging material, for example a single web of flexible packaging material, into tubing designated T, with the tubing extending downwardly, the tubing being intermittently fed downwardly and transversely heat sealed at package length intervals L, and a quantity of the product with which the packages are to be filled being delivered into the lower end of the tubing to provide a fill for each package during the intervals between successive sealing operations. As herein illustrated, the forming, feeding and sealing of the tubing may be carried out by means of vertical form-fill-seal apparatus such as shown in the coassigned U.S. Pat. No. 4,288,965 of Robert C. James, issued Sept. 15, 1981, involving a pair of heat sealing members, more particularly a pair of heat sealing jaws, intermittently movable in and out in a fixed horizontal plane between the fully open position in which they are illustrated in FIGS. 1, 2 and 6 and a closed position in sealing engagement with the tubing (see FIG. 4) for forming a transverse seal S across the tubing. While the sealing members are in engagement with the tubing, the tubing is appropriately cut transversely of the tubing at the seal to form an upper seal S2 for the package being completed and a lower seal S1 for the next package to be formed. It is to be understood that, broadly considered, these operations may be carried out by means of other types of vertical form-fill-seal apparatus including, for example, apparatus of the type in which the sealing jaws are movable up and down, closing on the tubing at the top of their stroke and pulling down a package length increment of the tubing, the sealing jaws then opening and moving up to the top of their stroke, so as to provide a package length increment of the tubing extending down from the sealing jaws at the top of their stroke.

The method of the invention is characterized in that the tubing is pinched closed above and below the sealing members after the tubing has been fed downwardly each package length interval and following completion of the delivery of the fill for the next package to be formed, thereby to keep product for the next fill from dropping down in the tubing onto the next seal. The sealing members are then closed to form the next seal; the tubing is cut at the seal to form the top and bottom seals TS, BS; the sealing members are opened; the upper and lower pinches are maintained as the sealing members open, with the upper pinch serving to keep product from dropping down into the next seal and the bottom pinch serving to hold the bag being completed; and air is blown on the seals to cool them as the sealing members open.

FIGS. 1–6 illustrate the method as it relates to the type of operation in which the heat sealing members or jaws, which are generally designated 17, operate in a fixed generally horizontal plane, being movable relative to one another toward and away from one another between an open position (FIGS. 1, 2 and 6) spaced apart a distance somewhat greater than the diameter of the tubing T and closed position (FIG. 4) in sealing engagement with the tubing for forming the transverse seal at S. Typically, although not essentially, one of the sealing jaws carries a knife at 71 adapted to be driven into a slot 73 in the other jaw when the jaws have closed (conventionally by means of an air cylinder) for transversely cutting the tubing through the seal, thereby forming the trailing or upper end seal S2 for the package being completed and the leading or lower end seal S1 for the next package to be formed.

FIG. 1 illustrates the sealing members 17 open at the end of one forming, filling and sealing cycle and the beginning of the next cycle. As shown therein, a completed package P, its upper seal indicated at S2, is dropping away. The lower end of tubing T, sealed as indicated at S1, is at the level of the sealing members 17. These seals S1, S2 are cooled as a result of a previous cooling operation as will become apparent as this description progresses. The tubing T is fed downwardly between the sealing members 17, one package length increment, i.e., to the point where its lower end is one package length L below the level of the sealing members as shown in FIG. 2. A measured quantity of the product with which the package is to be filled is delivered into the tubing from above (as is conventional in vertical form/fill/seal operations) and drops down in the tubing to the lower end of the tubing. The stated quantity of the product, which may be referred to as the package fill, is indicated at PF in FIG. 2.

With the sealing members 17 open, and after the delivery of product into the tubing and before the next seal is made, the tubing is pinched closed above and below the sealing members as shown in FIG. 3 to keep product for the next package fill from dropping down in the tubing onto the next seal to be made, and for holding the package being completed. The pinching is effected by means of upper and lower pairs of pinch members designated 75 and 77, respectively, extending transversely of the tubing generally parallel to the sealing members 17, the tubing extending down between these pinch members.

The sealing members 17 are then closed as shown in FIG. 3 to form the next seal S comprising the top (trailing) seal S2 for the package P being completed and the bottom (leading) seal S1 at the lower end of tubing T for the next package to be formed. With the sealing members closed, the knife 71 is actuated to cut through the tubing between the seals S2 and S1 to sever the completed package from the tubing.

The sealing members 17 are then opened, but the upper and lower pinches are held on the tubing (above and below the level of the sealing members) as the sealing members are opened, as shown in FIGS. 5 and 6. That is, while the sealing members 17 open, the upper and lower pairs of pinch members 75, 77 are maintained closed. As the sealing members open, and while holding the upper and lower pinches on the tubing to keep product from dropping down onto the seal S1 just formed, and to prevent the package being completed from dropping away, air is blown on the seals S1, S2 just formed to cool them as indicated by arrows in FIG. 6. The air is blown down on the bottom seal S1 from the vicinity of the upper pinch and up on the upper seal S2 from the vicinity of the lower pinch beginning with the initial opening movement of the sealing members (FIG. 5) and continuing for an interval of time sufficient to cool the seals. The cooling air is blown down and in on opposite sides of the tubing against opposite sides of the seal S1 by air blowing means 79 carried by the upper pinch members 75. Cooling air is also blown up and in on opposite sides of the tubing against opposite sides of the seal S2 by air blowing means 81 associated with the lower pinch members 77.

Now referring to FIGS. 7 and 8, the invention is shown as incorporated in a vertical form-fill-seal apparatus such as shown in the aforesaid coassigned U.S. Pat. No. 4,288,965 wherein a web W of flexible packaging material is pulled from a supply, fed over means 3 for forming the web into the tubing T, product to be packaged is provided in the tubing, and sealing operations are performed on the tubing to seal it to form package. The packaging material may be low density polyethylene film, for example, and the supply may be constituted by a roll R of the film suitably supported as indicated at 7. The forming means 3 may be a forming shoulder generally of a conventional type such as shown, for example, in the coassigned U.S. Pat. No. 3,050,906 issued Aug. 28, 1962, U.S. Pat. No. 3,449,888 issued June 17, 1969, and U.S. Pat. No. 3,664,086 issued May 23, 1972.

As shown in FIGS. 7 and 8, the forming shoulder 3 forms the web W of packaging material into tubing T with the longitudinal margins 9 and 11 of the web W in lapping relationship, and directs the tubing downwardly around a vertically extending, hollow mandrel 13. As illustrated, margin 9 is on the inside, margin 11 on the outside. At 15 in FIG. 7 is diagrammatically indicated suitable means for sealing the lapping margins 9 and 11 of the web to form a longitudinal seam for the tubing. Product is provided in the tubing T via the hollow mandrel 13 in suitable conventional manner, and the tubing is transversely heat sealed at package length intervals by the heat sealing jaws or bars 17 at 5 below the lower end of the mandrel. The sealing jaws 17 are operable in a fixed horizontal plane below the lower end of the mandrel to form the top seal S2 for the package being completed and the bottom seal S1 for the next package to be formed. One of the seal bars carries the knife 71 and the other has the groove 73 receiving the knife for cutting transversely between the seals made at 5 to separate the completed package P from the tubing. The tubing is intermittently fed downward one package length increment, the jaws 17 being open. The tubing dwells between successive feed cycles, the jaws 17 being closed on the tubing for the transverse sealing operation during each dwell.

The web W is intermittently pulled from supply roll R, measured for each sealing operation at 5, and fed forward toward the forming shoulder 3 by means indicated generally at F located between the supply roll and the forming shoulder. This means F is intermittently operable to feed the web forward one package length increment in a given interval, acting as a web feeding and measuring or metering means. As illustrated, it comprises a lower roll 19 and an upper roll 21 with means indicated generally at 23 for intermittently driving these rolls through a predetermined interval corresponding to the desired length for the packages to be formed to feed the web forward one such increment. As shown in FIG. 8, the driving means 23 comprises a continuously operating electric motor/speed reducer unit 25 driving the input of an electric clutch/brake unit 27 via gearing indicated at 29, the output of the clutch/brake unit being connected to the lower roll 19 as indicated at 31. The rolls 19 and 21 are geared together as indicated at 33. The clutch of unit 27 is adapted intermittently to be engaged and the brake of unit 27 disengaged for driving the rolls 19 and 21 to feed forward the requisite package length increment of web W on each feed cycle by a suitable programmable control 35 which is under the control of an encoder 37 (see FIG. 9), the clutch being disengaged and the brake engaged to terminate the feed cycle and remaining so for the dwell of the web W and tubing T, the clutch then being engaged and the brake disengaged for the next feed cycle.

The web W travels from the measuring and feeding rolls 19 and 21 under a guide roll 38 and thence up to and around forming shoulder 3. The increment of the web W fed forward by the measuring and feeding rolls 19 and 21 is taken up and pulled over the forming shoulder 3 under tension by tubing feeding means indicated generally at 39 in FIGS. 7 and 8 below (downstream from) the forming shoulder. This tubing feeding means 39 acts to pull the web over the forming shoulder 3 under tension to maintain the web taut. The tubing feeding means tends to draw the tubing down (forward) on the mandrel 13 a distance greater than the package length increment in the stated interval of operation of the rolls 19 and 21. The draw-down force on the tubing is relatively low. While means 39 tends to draw the tubing T down a greater distance than the package length increment, the tubing is drawn down only a distance corresponding to the package length increment (the tension is insufficient to stretch it to any substantial extent), and the package length increment of the web W metered out and fed forward by the rolls 19 and 21 is thereby taken up and pulled over the forming shoulder 3 under tension, with the tension substantially uniform for proper tracking of the material over the forming shoulder.

The tubing feeding means 39, as illustrated, comprises a pair of endless belts, and more particularly a pair of vacuum belts each designated 41 at opposite sides of the mandrel 13 (for vacuum gripping the tubing to feed it downward). Each belt is a flat belt trained around an upper pulley 43 and a lower pulley 45 and so arranged as to have a downwardly movable inner reach 41a engageable with the tubing T at the respective side of the mandrel 13. The two pulleys for each belt are mounted on a block 47 having a vacuum passage therein in which a vacuum is drawn in suitable conventional manner via a vacuum hose (see U.S. Pat. No. 4,288,965). The belt has holes 53 spaced at suitable intervals throughout is length. The inner reach 41a of the belt travels in sealing engagement with the face of the block 47 toward the mandrel 13, i.e., the inside of the block, in register with the inlet end of the stated vacuum passage in the block. As the belt travels past the inlet end of this passage, vacuum is drawn through those holes 53 in the belt which are in communication with the inlet. The tubing on the mandrel 13 is thereby vacuum gripped to the inner reach 41a of the belt for being fed downward by the belt.

The vacuum belts 41 are operated intermittently for feeding the tubing T downward on the mandrel 13 concurrently with each operation of the web feeding rolls 19 and 21. The belts may be started in operation generally at the same time or somewhat before the rolls 19 and 21 start feeding the web W. They are operated at such a rate relative to the rolls 19 and 21 as to tend to feed the tubing downward at a rate faster than that at which rolls 19 and 21 feed the web forward, and may be stopped generally at the same time or shortly after the rolls 19 and 21 stop. Means for operating the belts in this manner is shown to comprise a gear drive 59 from the electric motor/speed reducer unit 25 to the input of each of a pair of air-operated slip clutches each designated 61, with individual drive trains as indicated at 63 from the outputs of the slip clutches to the upper pulleys 43 for the two belts 41. The slip clutches 61 are under control of an air valve 65 (FIG. 9) which is in turn controlled by the programmable control 35. The latter functions to actuate (engage) the slip clutches 61 to start driving the belts either at the same time or somewhat before the electric clutch/brake unit 27 is actuated, and to maintain the slip clutches engaged for driving the belts until the electric clutch/brake unit 27 is deactuated or somewhat thereafter, the slip clutches then being deactuated to stop the belts. While engaged, the slip clutches permit slip in the drives from the unit 25 to the belts.

In the operation of the apparatus of FIGS. 7 and 8, the motor/speed reducer unit 25 is operated continuously. The clutch/brake unit 27 is actuated (i.e., its clutch is engaged, its brake disengaged) in timed relation to a function of the apparatus such as a filling function, the encoder 37 being operable to signal the programmable control 35 to actuate the unit 27 to start driving rolls 19 and 21 to unwind the web W from the supply roll R and feed it forward at the appropriate time, e.g., when a scale such as indicated diagrammatically at 67 in FIG. 8 has weighed out the quantity of product (a "fill") to be delivered for a package, and has dumped the product for delivery down through the mandrel 13 into the tubing T. The unit 27 remains actuated for an interval such as to cause rotation of the rolls 19 and 21 to feed forward a package length increment of the web, and is then deactuated. The interval may be determined and controlled via the programmable controller 35 or by means of an optical scanning system operating in conjunction with registration marks at package length intervals on the web in the case of preprinted web, or by means measuring the rotation of the rolls 19 and 21 in the case of unprinted web, or in other suitable manner well known in the art.

The programmable control 35 (FIG. 9) operates to actuate the valve 65 for engaging the slip clutches 61 to start driving the belts 41 either at the same time or somewhat before the rolls 19 and 21 start feeding the web W forward toward the forming shoulder 3. Thus, when the rolls 19 and 21 operate to feed the web forward, the belts are in operation and act to draw down the tubing T formed as the web passes over the forming shoulder 3. The drive for the belts is such that they tend to travel at a rate greater than the rate at which rolls 19 and 21 feed the web forward. For example, they may tend to travel at a rate about 10% greater than the rate at which rolls 19 and 21 feed the web forward (that is, the belts if wholly free of any restraint would travel a distance 10% greater than the amount of web released (i.e., fed forward) by rolls 19 and 21. However, the tubing T cannot advance any faster than the rate at which rolls 19 and 21 feed the web forward without stretching (the web being caught in the nip of rolls 19 and 21) and the pull exerted by the belts on the tubing is relatively light and too low to cause any substantial stretching. Hence, the belts travel generally at a greater rate than the web and, in tending to travel faster than the web, exert a downward pull on the tubing T to tension it and thereby pull the material over the forming shoulder 3 under tension to maintain the web taut. The operation of the belts at a greater rate than the speed of the web feed is governed and controlled by slippage in the slip clutches 61, and by some slippage of the belts past the packaging material.

At the start of the downward feed of the tubing T, the sealing jaws or bars 17 are open, and remain open throughout the downward feed of the tubing off the lower end of the mandrel 13.

When the rolls 19 and 21 have measured out and fed forward one package length of web W, and the belts 41 have drawn the tubing T down one package length on the mandrel and fed one package length of the tubing T off the lower end of the mandrel, the clutch/brake unit 27 is deactuated to stop the rolls 19 and 21 and thereby stop the forward feed of the web, for the dwell of the web and the tubing for the sealing operation. The slip clutches 61 are deactuated either at the same time as the rolls 19 and 21 stop, or slightly thereafter. When deactuated, the slip clutches may be wholly disengaged so as to stop drives 63 to the belts 41, or they may remain lightly engaged to exert a light drive via 63 on the belts so that the belts exert a light draw-down force on the tubing to maintain tension in the tubing.

With the tubing T stopped, and with a fill PF in the tubing above the transverse seal S1 at the lower end of the tubing (this seal being one package length below the sealing jaws 17 and constituting the bottom seal for the package to be completed) the jaws are closed on the tubing to form the top seal S2 for the package P being completed and the bottom seal S1 for the next package to be formed. The jaws then open, and rolls 19 and 21 and belts 41 are operated through the next feed cycle.

As shown in FIGS. 10-12, each of the sealing members 17 is mounted for movement transversely of its length in a horizontal plane. The sealing members may, for example, be part of a high-speed sealing and cutting system sold by Hayssen Manufacturing Company of Sheboygan, Wis., under the trademark "Quali-Seal". The sealing members are carried by a pair of carriages, each generally designated 201 (FIG. 12), slidable on a pair of slide guide rods 205 extending horizontally parallel to one another in the direction of movement of the jaws. Suitable drive means generally indicated at 207 actuated by an air cylinder unit 209 (FIG. 9) is provided for sliding the carriages back and forth on the rods 205 to reciprocate the sealing members 17 toward and away from each other between an open position (FIG. 10) and a closed position for sealing the tubing. The air cylinder unit is under the control of a suitable air valve 210 which is in turn under the control of the programmable control 35. As shown in FIG. 10, each sealing member or jaw comprises two vertically spaced-apart grippers 211 engageable with the tubing transversely of the tubing to grip it, and heated sealing elements 213 engageable with the tubing for sealing it in the area between the grippers. One of the jaws carries the knife 71 for cutting the seal to form seals S1 and S2, and the other jaw carries the slot 73 for receiving the knife. It will be understood that other sealing and cutting systems with different jaw constructions may also be used.

The upper pair of pinch members 75 comprise a pair of elongate pinch plates extending transversely of the tubing T generally parallel to the sealing members 17 at an elevation above the sealing members. These pinch plates are mounted on two carriages, each generally indicated at 221, for movement of the pinch plates 75 relative to one another, and relative to the sealing members 17 and tubing, in a generally horizontal plane between an open position in which the pinch plates are spaced apart to enable downward feeding of the tubing between the sealing members 17, and a closed position in engagement with and pinching the tubing closed above the level of the sealing members 17. The pinch plates are arranged in a generally V-shaped formation so that, when the pinch plates are closed (FIG. 16), the lower edges of the plates are spaced relatively close together for pinching the tubing therebetween, with the plates diverging upwardly away from their lower edges for supporting the bottom of the next package to be formed.

Figure 16:
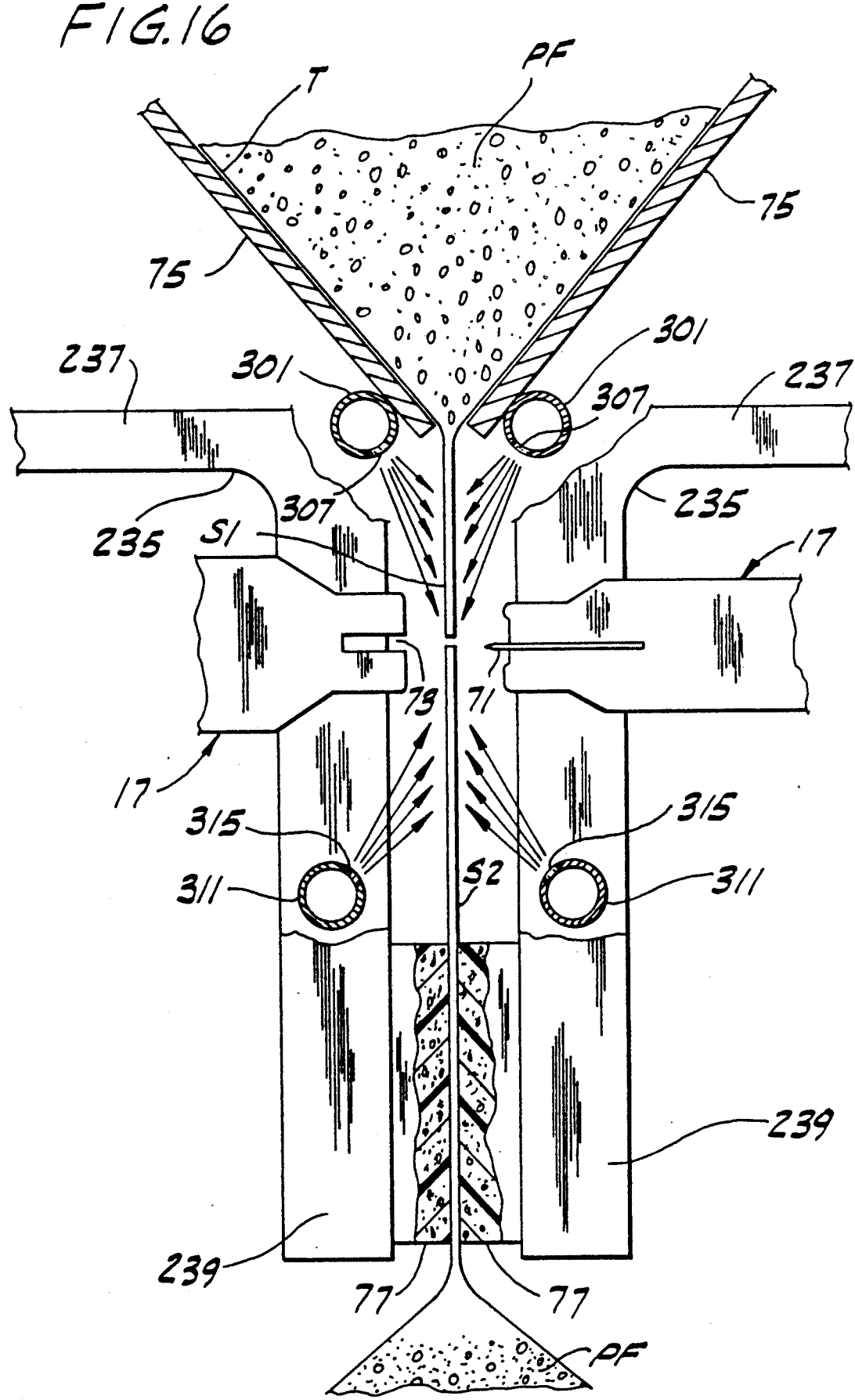
FIG. 16 is an enlarged view of the pinching, sealing and cooling mechanism, the sealing jaws being shown opening and the upper and lower pinch members being shown in their closed positions.

The carriages 221, also carry the lower pair of pinch members 77 which are movable in a generally horizontal plane conjointly with the upper pinch members 75 and relatively to the sealing members 17 and tubing, between an open position in which the pinch members are spaced apart to enable downward feeding of the tubing between the sealing members 17, and a closed position in engagement with and pinching the tubing closed below the level of the sealing members 17. The lower pinch members 77 preferably comprise a pair of rectangular pads engageable with opposite sides of the tubing at a location spaced closely above the product fill PF in the package being completed, as shown in FIG. 16 thereby to deflate the tubing in the area above the fill PF to exhaust air from the package prior to sealing. The pads can be made of any relatively soft resiliently deformable material (e.g., a sponge-like material) capable of gripping the tubing T without damaging it.

Referring to FIG. 11, it will be observed that each carriage 221 carrying a respective set of upper and lower pinch members 75, 77 comprises a framework having vertically spaced generally horizontal top and bottom frame members indicated at 227 and 229, respectively, extending generally transversely with respect to the direction of movement of the pinch members. The upper pinch plate 75 carried by the carriage is affixed to the top frame member 227, and the lower pinch member or pad 77 is affixed to the bottom frame member 229. The top and bottom frame members are interconnected at opposite sides of the framework by side frame assemblies, each such assembly comprising an upper generally rectangular plate 231 connected to the top frame member 227 and a lower L-shaped bar 235 having a horizontal leg 237 fastened to the upper plate 231 and a depending leg 239 connected to the bottom frame member 229. The framework is open at its center to permit movement of a respective sealing jaw 17 between its open and closed positions independent of the movement of the pinch members 75, 77.

Indicated generally at 241 in FIG. 12 is means mounting the carriages 221 for movement of the upper and lower pairs of pinch members 75, 77 between their stated open and closed positions. Specifically, this means comprises a generally rectangular horizontal frame 243 (as viewed in FIG. 12) removably mounted by means of brackets 245 on the framework 247 of the vertical form-fill-seal apparatus, two pairs of pulleys 251a, 251b and 253a, 253b mounted at two adjacent corners of the frame 243, with the two pulleys of each pair being disposed one above the other and rotatable about a single vertical axis, two pulleys 255, 257 mounted at the remaining two corners of the frame for rotation about a single horizontal axis, a cable 261 trained around the pulleys, and a double-acting pneumatic cylinder unit 265 mounted on the frame for pulling the cable to move the carriages in a manner to be described. As illustrated best in FIGS. 10, 12 and 14, the cable 261 is attached at its ends to the piston rods 271, 273 of the air cylinder unit 265 and extends around the pullies in the manner shown to form a first upper reach 261a of cable extending between pullies 251a and 255, a second lower reach 261b of cable extending between pullies 255 and 251b, a third lower reach 261c of cable extending between pullies 251b and 253b, a fourth lower reach 261d of cable extending between pullies 253b and 257, and a fifth upper reach 261e of cable extending between pullies 257 and 553a. One of the carriages 221 carrying one set of upper and lower pinch members 75, 77 is connected by a cable clamp 281 to the upper reach 261e of cable at one side of the frame 243 and by a cable clamp 283 to the lower reach 261b at the opposite side of the frame (see FIG. 11). The other carriage 221 carrying the second set of upper and lower pinch members 75, 77 is similarly connected by cable clamps 281, 283 to upper and lower reaches 261b and 261e of cable at opposite sides of the frame, the arrangement being such that actuation of the air cylinder 265 to move the piston rods 271, 273 in one direction causes the carriages 221 to move apart to open the two sets of pinch members 75, 77 and actuation of the air cylinder to move the piston rods in the opposite direction causes the carriages to move toward one another to close the two sets of pinch members. Actuation of the cylinder unit 265 is under control of an air valve 267 controlled by the programmable control 35 so that the opening and closing of the pinch members 75, 77 may be effected independently of the opening and closing of the sealing jaws 17. Thus, it will be understood that the programmable control 35 may be programmed to vary the opening and closing of the pinch members relative to the opening and closing of the sealing jaws, which is important for accommodating such factors as variations in web material and thickness.

The range of travel of the carriages 221 carrying the pinch members 75, 77 is controlled by means of a bumper block 291 mounted on the frame 243 for engagement by one of the piston rods 271 to limit the extension of the rod. As shown in FIG. 15, the bumper block may be removably mounted by one or more suitable fasteners 293 in any one of a plurality of positions on the frame, depending on the desired maximum open position of the pinch members. For example, if relatively narrow packages are being formed, requiring that the pinch members 75, 77 open only a relatively small distance, the bumper block 291 may be moved to a position to restrict the extension of piston rod 271 and thus limit the opening of the pinch members, thereby reducing each cycle time from the time which would be required if the pinch members opened their maximum distance. If, on the other hand, the packages being formed are wider, then the bumper block 291 may be moved to allow the piston rod 271 to extend a greater distance so that the pinch members open wider to accommodate the wider packages. Of course, other suitable means may be used for adjustably controlling the extent to which the pinch members open.

Figure 17:
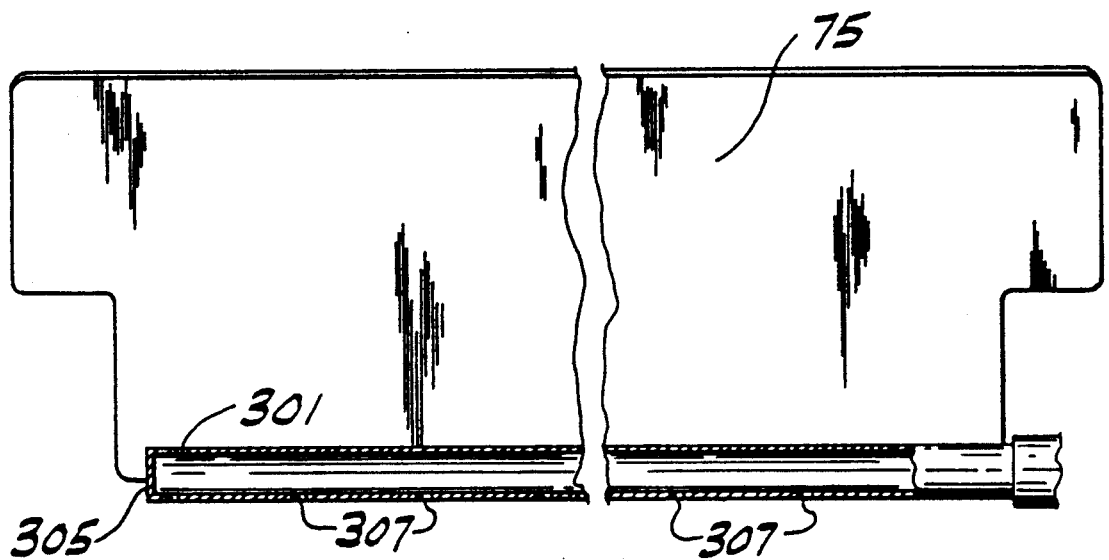
FIG. 17 is a view showing an upper pinch member and associated air delivery tube for delivering cooling air to a seal.

The air blowing means 79 carried by the upper pinch members or plates 75 comprises a pair of air delivery tubes 301, one on each of the pinch plates, each extending lengthwise of the pinch plate on the outside of the pinch plate adjacent the bottom edge of the plate, being secured to the pinch plate as by welding. Each air delivery tube has a flexible air delivery line 303 connected to one of its ends, is closed at its other end, as indicated at 305 in FIG. 17, and has a series of air delivery holes 307 spaced at intervals along its length. These holes are directed downwardly and inwardly (see FIG. 16) for blowing air downwardly and inwardly on opposite sides of the seal S1 which has just been made by the sealing jaws 17 as the sealing jaws open, effectively and quickly to cool the seal. Similarly, the air blowing means 81 associated with the lower pinch members or pads 77 comprises a pair of air delivery tubes 311, one associated with each pinch pad, each extending horizontally between the side bars 239 of the respective carriage immediately above the pinch pad 77. One end of each air delivery tube 311 is closed and the other end is connected to a flexible air delivery line 313. Each air delivery tube has a series of air delivery holes 315 spaced at intervals along its length. These holes are directed upwardly and inwardly (see FIG. 16) for blowing air upwardly and inwardly on opposite sides of the seal S2 which has just been made by the sealing jaws 17 as the sealing jaws open, effectively and quickly to cool the seal.

Air is delivered to the air delivery tubes 301, 311 from a suitable source (not shown) via a suitable air valve 321 and the flexible lines 303, 313 (FIG. 9). The valve 321 is under the control of the programmable control 35, the latter functioning to open the valve for blowing cool air on the seals S1, S2 just made as the sealing jaws 17 start to open, and to close the valve to cut off the flow of air after an interval of time sufficient to cool the seals. This interval of time will vary depending on such factors as tubing material and thickness.

A cycle of operation of the apparatus may be regarded as starting with the sealing jaws 17 open, the upper and lower pinch members 75, 77 open, and the lower end of the tubing T having a seal S1 in the horizontal plane of the sealing jaws as shown in FIG. 1. This seal is cooled and set. A completed package P with a seal S2 (also cooled and set) at the top is dropping away. Product for the next package fill has been and is being delivered to the lower end of the tubing T, which is being held in by the cooled and set seal S1.

Under the control of the programmable control 35 (which may be referred to generally as control means), a package length interval L of the tubing T is fed down between the upper open pinch members 75, the open sealing jaws and the open lower pinch members 77 (FIG. 2). Valve 267 is then actuated to cause the upper pinch plates 75 and lower pinch pads 77 to move to their closed positions pinching the tubing T closed above and below the level of the sealing jaws 17. The closure of the pinch plates and pads on the tubing occurs after the tubing containing a product fill has been fed downwardly a package length interval L. The closure of the upper pinch plates 75 serves to keep product from dropping down in the tubing on to the next seal to be made, and to support the bottom of the tubing immediately above the next seal to be formed. The closure of the lower pinch pads 77 serves to hold the package being completed, and also to deflate the upper end of the package by exhausting air above the fill from the package. Deflation of the package is advantageous in many situations to facilitate and/or economize packing, transportation and handling of the package.

Immediately following the closure of the upper and lower pinch members 75, 77 on the tubing, the programmable control 35 sends a signal to set valve 210 to cause the sealing jaws 17 to close upon the tubing T to form a seal, the knife 71 then being actuated to cut through the seal to form seals S1 and S2. After the sealing jaws have thus formed the seals (the time it takes to form the seal depending on such factors as tubing material and thickness), the valve 210 is set by the control 35 to cause the jaws to open, the upper and lower pinch members 75, 77 remaining closed to maintain their pinches on the tubing T. While thus holding the pinches, control 35 opens the valve 321 to deliver air to the tubes 301, 311 for blowing air down and in on the seal S1 and up and in on seal S2 from opposite sides of the seals to cool them as the sealing jaws open. Air is blown on the seals for an interval of time sufficient to set the seals (this interval will vary, as noted above), whereupon the programmable control 35 sets the valve 267 to cause the pinch members to open, releasing the package just completed. The cycle then repeats.

It will be understood that the sealing and cooling time intervals will vary depending on different factors such as tubing material and thickness, and machine speed. It is important, therefore, that the movement of the upper and lower pinch members 77, 75 between their open and closed positions be independent of the movement of the sealing jaws 17 between their open and closed positions. The independent movement of these machine components, under the control of the programmable control 35, enables the timing of the opening and closing of the upper and lower pinch members relative to the opening and closing of the sealing jaws to be varied as needed according to the interval of time necessary to form the seal and the interval of time needed to cool it. The programmable control 35 is simply suitably programmed to effect the appropriate relative movement of the sealing jaws and the pinch members to achieve the desired sealing and cooling times. For example, if longer cooling of the seals S1, S2 is necessary or preferred, as may be the case where the tubing T is formed from a thicker web of material, or where the web material requires greater cooling, or where machines speeds are sufficiently low as to permit longer cooling intervals for even more effective setting of the seals, the control 35 may be programmed to maintain the pinch members 75, 77 closed for a greater interval of time after the sealing jaws 17 open. This increases the period of time over which cooling air may be blown on the seals while the air tubes 301, 311 are positioned immediately adjacent the seals S1, S2 for maximum effectiveness.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. The method of forming, filling and sealing packages comprising:
    forming flexible packaging material into tubing, the tubing extending downwardly;
    feeding the tubing downwardly and heat sealing it to form transverse seals spaced at package length intervals, the seals being formed by a pair of sealing members movable relative to one another between a fully open position and a closed position in sealing engagement with the tubing; and
    delivering a quantity of product with which the packages are to be filled into the tubing to provide a fill for each package;
    wherein the improvement comprises:
    providing a pair of upper pinch members extending transversely of the tubing generally parallel to the sealing members above the sealing members, the tubing extending down between the upper pinch members, the upper pinch members being movable relatively to one another, and relatively to the sealing members, between an open position and a closed position in engagement with and pinching the tubing closed above the level of the sealing members;
    providing a pair of lower pinch members extending transversely of the tubing generally parallel to the sealing members below the sealing members, the tubing extending down between the lower pinch members, the lower pinch members being movable relatively to one another, and relatively to the sealing members, between an open position and a closed position in engagement with and pinching the tubing closed below the level of the sealing members;

closing the upper and lower pinch members to pinch the tubing closed above and below the sealing members after the tubing has been fed downwardly each package length interval and following completion of the delivery of the fill for the next package to be formed, the top pinch members serving to keep product for the next fill from dropping down in the tubing onto the next seal and the lower pinch members serving to hold the package being completed;

closing the sealing members and maintaining them closed an interval of time sufficient to form the next seal;

cutting through the tubing at the seal while the sealing members are closed and thereby forming a top seal for the package being completed and a bottom seal for the next package to be formed;

opening the sealing members;

maintaining the upper and lower pinch members closed above and below the sealing members as the sealing members open;

while so maintaining the upper and lower pinch members closed, blowing air on the top and bottom seals thereby to cool the seals;

the movement of the upper and lower pinch members between their open and closed positions being independent of the movement of the sealing members between their open and closed positions so that timing of the opening and closing of the upper and lower pinch members relative to the opening and closing of the sealing members may be varied; and varying the timing of the opening and closing of the upper and lower pinch members relative to the opening and closing of the sealing members according to the interval of time necessary to form and/or cool said top and bottom seals.

2. The method of claim 1 wherein air is blown up on the top seal of the package being completed and down on the bottom seal of the next package to be formed.

3. The method of claim 2 wherein the air is blown down and in on opposite sides of the tubing against opposite sides of the bottom seal for the next package to be formed from the vicinity of the pinch, and up and in on opposite sides of the tubing against opposite sides of the top seal for the package being completed from the vicinity of the pinch.

4. The method of claim 1 further comprising deflating the tubing in the area above the fill in the package being completed as the tubing is pinched below the sealing members.

5. The method of claim 4 wherein the pinch of the tubing below the sealing members is over a relatively large vertical extension of the tubing thereby to deflate the tubing in the area above the fill.

6. Apparatus for forming, filling and sealing packages comprising:

means for forming flexible packaging material into tubing;

a pair of sealing members extending transversely of the tubing for heat sealing it to form transverse seals across the tubing spaced at package length intervals, the tubing extending down between the sealing members;

means for moving the sealing members relatively to one another between an open position spaced from one another, enabling relative movement of the tubing and sealing members to provide a package length of tubing extending down from the level of the sealing members, and a closed position in sealing engagement with the tubing to form a transverse seal across the tubing;

means for cutting through the tubing at the seal when the sealing members are closed and thereby forming a top seal for the package being completed and a bottom seal for the next package to be formed;

means for delivering a quantity of product with which the packages are to be filled into the tubing to provide a fill for each package;

said apparatus being characterized in having:

a pair of upper pinch members extending transversely of the tubing generally parallel to the sealing members above the sealing members, the tubing extending down between the upper pinch members, a pair of lower pinch members extending transversely of the tubing generally parallel to the sealing members below the sealing members, the tubing extending down between the lower pinch members, the upper pinch members being movable relatively to one another, and relatively to the sealing members and tubing, between an open position enabling the stated relative movement of the tubing and sealing members to provide the said package length of tubing extending down from the level of the sealing members, and a closed position in engagement with and pinching the tubing closed above the level of the sealing members;

the lower pinch members being movable relatively to one another, and relatively to the sealing members and tubing, between an open position enabling the stated relative movement of the tubing and sealing members to provide the said package length of tubing extending down from the level of the sealing members, and a closed position in engagement with and pinching the tubing closed below the level of the sealing members;

the upper and lower pinch members being movable independently of the sealing members so that the timing of the opening and closing of the upper and lower pinch members relative to the opening and closing of the sealing members may be varied;

means for varying the timing of the opening and closing of the upper and lower pinch members relative to the opening and closing of the sealing members;

means associated with the lower pinch members for blowing air on the top seal of each package being competed upon opening of the sealing members;

means associated with the upper pinch members for blowing air on the bottom seal of each package next to be formed upon opening of the sealing members;

control means for controlling the movement of the upper and lower pinch members independently of the movement of the sealing members to cause the upper and lower pinch members to close on the tubing before the sealing members come together to form a transverse seal, to remain closed as the sealing members come together to form the transverse seal and then move toward their fully open position after the transverse seal has been formed, and then to open;

said control means being adjustable for varying the timing of the opening and closing of the upper and lower pinch members relative to the opening and closing of the sealing members; and means for controlling the blowing means to cause it to blow air on said top and bottom seals starting with the initial opening movement of the sealing members exposing the seals and continuing as the sealing members move toward their open position, while the upper and lower pinch members remain closed.

7. Apparatus as set forth in claim 6 wherein the air blowing means associated with the upper pinch members is arranged to blow air down on the bottom seal of the next package to be formed, and the air blowing means associated with the lower pinch members is arranged to blow air up on the top seal of the package being completed.

8. Apparatus as set forth in claim 7 wherein the air blowing means associated with the upper pinch members is arranged to blow air down and in on opposite sides of the tubing against opposite sides of the bottom seal from the vicinity of the pinch, and the air blowing means associated with the lower pinch members is arranged to blow air up and in on opposite sides of the tubing against opposite sides of the top seal from the vicinity of the pinch.

9. Apparatus as set forth in claim 6 wherein the air blowing means associated with the upper pinch members is carried by the upper pinch members, and the air blowing means associated with the lower pinch members is carried by the lower pinch members.

10. Apparatus as set forth in claim 9 wherein the air blowing means associated with the upper pinch members is arranged to blow air down and in on opposite sides of the tubing against opposite sides of the bottom seal for the next package to be formed from the vicinity of the pinch, and the air blowing means associated with the lower pinch members is arranged to blow air up and in on opposite sides of the tubing against opposite sides of the top seal for the package being completed from the vicinity of the pinch.

11. Apparatus as set forth in claim 6 wherein said sealing members are movable in a horizontal plane toward and away from the tubing, said apparatus further comprising means mounting the upper pinch members for movement toward and away from the tubing in a generally horizontal plane disposed above the horizontal plane of the sealing members, and means mounting the lower pinch members for movement toward and away from the tubing in a generally horizontal plane disposed below the horizontal plane of the sealing members.

12. Apparatus as set forth in claim 6 wherein said lower pinch members are positioned and configured so that when they pinch the tubing closed, they function to deflate the tubing in the area above the fill in each package being completed.

13. Apparatus as set forth in claim 12 wherein the lower pinch members comprise a pair of pads engageable with opposite sides of the tubing at a location spaced closely above the product fill in the package being completed thereby to deflate the tubing in the area above the fill.

14. Apparatus as set forth in claim 6 wherein the upper pinch members are arranged for supporting the bottom of the next package to be formed as fill is delivered to the next package to be formed.

15. Apparatus as set forth in claim 14 wherein the upper pinch members comprise a pair of pinch plates arranged in a generally V-shaped formation, the lower edges of the plates being spaced relatively close together for pinching the tubing therebetween, the plates diverging upwardly away from their lower edges for supporting the bottom of the next package to be formed.

16. The method of forming, filling and sealing packages comprising:

forming flexible packaging material into tubing, the tubing extending downwardly;

feeding the tubing downwardly and heat sealing it to form transverse seals spaced at package length intervals, the seals being formed by a pair of sealing members movable relative to one another between a fully open position and a closed position in sealing engagement with the tubing; and delivering a quantity of product with which the packages are to be filled into the tubing to provide a fill for each package;

wherein the improvement comprises:

pinching the tubing closed above and below the sealing members after the tubing has been fed downwardly each package length interval and following completion of the delivery of the fill for the next package to be formed, thereby to keep product for the next fill from dropping down in the tubing onto the next seal;

deflating the tubing in the area above the fill in the package being completed as the tubing is pinched below the sealing members;

closing the sealing members to form the next seal;

cutting through the tubing at the seal while the sealing members are closed and thereby forming a top seal for the package being completed and a bottom seal for the next package to be formed;

opening the sealing members while maintaining the pinch above and below the sealing members thereby to expose the top and bottom seals; and while so maintaining the pinch above and below the sealing members, blowing air on the top and bottom seals thereby to cool the seals.

17. The method of claim 16 wherein the pinch of the tubing below the sealing members is at a location spaced closely above the product fill in the package being completed thereby to deflate the tubing in the area above the fill.

18. Apparatus for forming, filling and sealing packages comprising:

means for forming flexible packaging material into tubing;

a pair of sealing members extending transversely of the tubing for heat sealing it to form transverse seals across the tubing spaced at package length intervals, the tubing extending down between the sealing members;

means for moving the sealing members relatively to one another between a fully open position spaced from one another, enabling relative movement of the tubing and sealing members to provide a package length of tubing extending down from the level of the sealing members, and a closed position in sealing engagement with the tubing to form a transverse seal across the tubing;

means for cutting through the tubing at the seal when the sealing members are closed thereby to form a top seal for the package being completed and a bottom seal for the next package to be formed;

means for delivering a quantity of product with which the packages are to be filled into the tubing to provide a fill for each package;

said apparatus being characterized in having:

a pair of upper pinch members extending transversely of the tubing generally parallel to the sealing members above the sealing members, the tubing extending down between the upper pinch members, a pair of lower pinch members extending transversely of the tubing generally parallel to the sealing members below the sealing members, the tubing extending down between the lower pinch members, the upper pinch members being movable relatively to one another, and relatively to the sealing members and tubing, between an open position enabling the stated relative movement of the tubing and sealing members to provide the said package length of tubing extending down from the level of the sealing members, and a closed position in engagement with an pinching the tubing closed above the level of the sealing members;

lower pinch members being movable relatively to one another, and relatively to the sealing members and tubing, between an open position enabling the stated relative movement of the tubing and sealing members to provide the said package length of tubing extending down from the level of the sealing members, and a closed position in engagement with and pinching the tubing closed below the level of the sealing members;

the lower pinch members being so positioned and configured that when they pinch the tubing closed, they function to deflate the tubing in the area above the fill in each package being completed;

the upper and lower pinch members being movable independently of the sealing members so that they may remain in their closed positions while the sealing members move toward their fully open position following the formation of the top seal of the package being completed and the bottom seal of the next package to be formed;

means associated with the lower pinch members for blowing air on the top seal of each package being completed upon opening of the sealing members;

means associated with the upper pinch members for blowing air on the bottom seal of each package next to be formed upon opening of the sealing members;

means for controlling the upper and lower pinch members independently of the sealing members to cause them to close on the tubing before the sealing members come together to form a transverse seal, to remain closed as the sealing members move toward their fully open position, and subsequently to open; and means for controlling the blowing means to cause it to blow air on said top and bottom seals as the sealing members open to expose the seals and continuing for a time sufficient to cool the seals.

19. Apparatus as set forth in claim 18 wherein the lower pinch members comprise a pair of pads engageable with opposite sides of the tubing at a location spaced closely above the product fill in the package being completed thereby to deflate the tubing in the area above the fill.

20. Apparatus as set forth in claim 18 wherein the upper pinch members are arranged for supporting the bottom of the next package to be formed as fill is delivered to the next package to be formed.

21. Apparatus as set forth in claim 20 wherein the upper pinch members comprise a pair of pinch plates arranged in a generally V-shaped formation, the lower edges of the plates being spaced relatively close together for pinching the tubing therebetween, the plates diverging upwardly away from their lower edges for supporting the bottom of the next package to be formed.

22. The method of forming, filling and sealing packages comprising:

forming flexible packaging material into tubing, the tubing extending downwardly;

feeding the tubing downwardly and heat sealing it to form transverse seals spaced at package length intervals, the seals being formed by a pair of sealing members movable relative to one another between a fully open position and a closed position in sealing engagement with the tubing; and delivering a quantity of product with which the packages are to be filled into the tubing to provide a fill for each package;

wherein the improvement comprises:

pinching the tubing closed above and below the sealing members after the tubing has been fed downwardly each package length interval and following completion of the delivery of the fill for the next package to be formed, thereby to keep product for the next fill from dropping down in the tubing onto the next seal;

closing the sealing members to form the next seal;

cutting through the tubing at the seal while the sealing members are closed to form a top seal for the package being completed and a bottom seal for the next package to be formed;

opening the sealing members to their fully open position;

maintaining the pinch above and below the sealing members as the sealing members open generally until they reach their fully open position; and while so maintaining the pinch above and below the sealing members, blowing air on the top and bottom seals thereby to cool the seals starting with the initial opening movement of the sealing members and continuing generally until they reach their fully open position.

23. Apparatus for forming, filling and sealing packages comprising:

means for forming flexible packaging material into tubing;

a pair of sealing members extending transversely of the tubing for heat sealing it to form transverse seals across the tubing spaced at package length intervals, the tubing extending down between the sealing members;

means for moving the sealing members relatively to one another between a fully open position spaced from one another, enabling relative movement of the tubing and sealing members to provide a package length of tubing extending down from the level of the sealing members, and a closed position in sealing engagement with the tubing to form a transverse seal across the tubing;

means for cutting through the tubing at the seal when the sealing members are closed to form a top seal for the package being completed and a bottom seal for the next package to be formed;

means for delivering a quantity of product with which the packages are to be filled into the tubing to provide a fill for each package;

said apparatus being characterized in having:

a pair of upper pinch members extending transversely of the tubing generally parallel to the sealing members above the sealing members, the tubing extending down between the upper pinch members, a pair of lower pinch members extending transversely of the tubing generally parallel to the sealing members below the sealing members, the tubing extending down between the lower pinch members, the upper pinch members being movable relatively to one another, and relatively to the sealing members and tubing, between an open position enabling the stated relative movement of the tubing and sealing members to provide the said package length of tubing extending down from the level of the sealing members, and a closed position in engagement with an pinching the tubing closed above the level of the sealing members;

the lower pinch members being movable relatively to one another, and relatively to the sealing members and tubing, between an open position enabling the stated relative movement of the tubing and sealing members to provide the said package length of tubing extending down from the level of the sealing members, and a closed position in engagement with and pinching the tubing closed below the level of the sealing members;

the upper and lower pinch members being movable independently of the sealing members so that they may remain in their closed positions while the sealing members move to their fully open position following the formation of the top seal of the package being completed and the bottom seal of the next package to be formed;

means associated with the lower pinch members for blowing air on the top seal of each package being completed upon opening of the sealing members;

means associated with the upper pinch members for blowing air on the bottom seal of each package next to be formed upon opening of the sealing members;

means for controlling the upper and lower pinch members independently of the sealing members to cause them to close on the tubing before the sealing members come together to form a transverse seal, to remain closed generally until the sealing members reach their fully open position, and then to open generally when the sealing members reach their fully open position; and means for controlling the blowing means to cause it to blow air on said top and bottom seals starting with the initial opening movement of the sealing members exposing the seals and continuing generally until the sealing members reach their fully open position, while the upper and lower pinch members remain closed.

* * * * *